June 6, 1944. C. R. BUSCH 2,350,671
BRAKE BEAM AND GUIDE THEREFOR
Filed Aug. 1, 1941 3 Sheets-Sheet 3
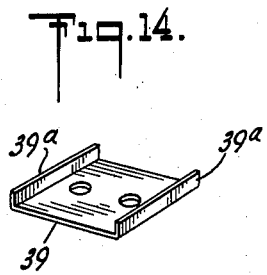
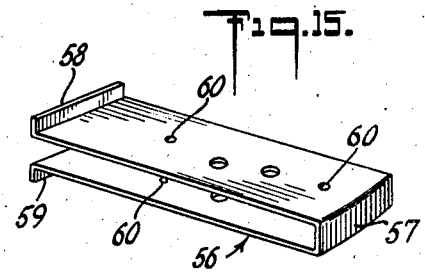
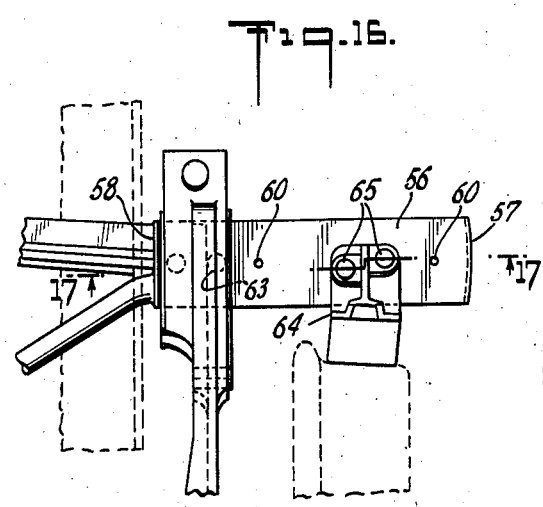
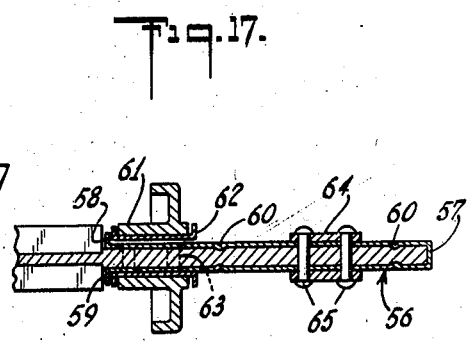
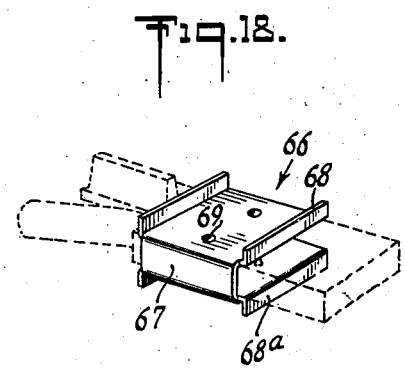
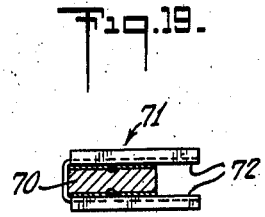
INVENTOR
CHARLES R. BUSCH.
BY
ATTORNEY Patented June 6, 1944

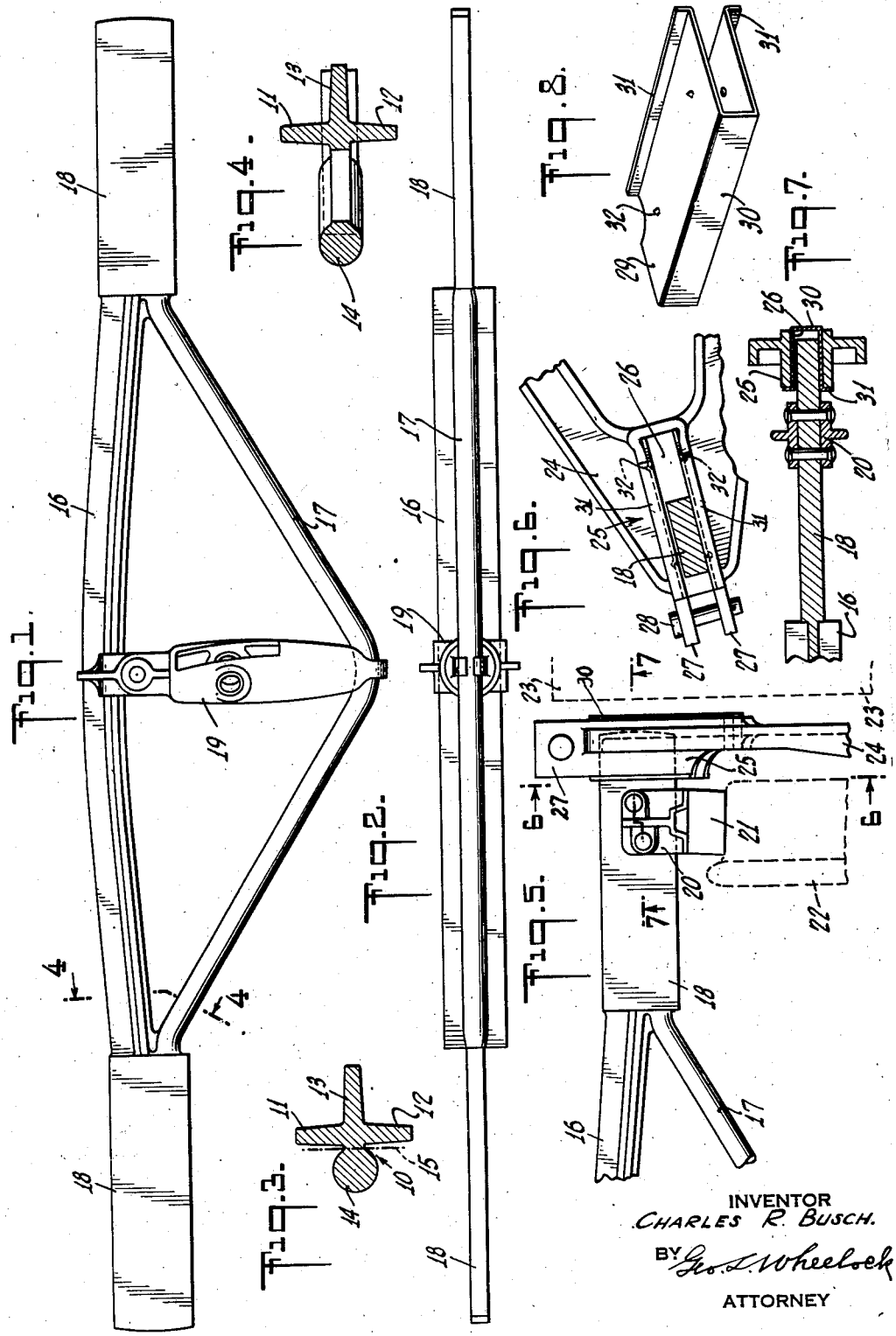
June 6, 1944. C. R. BUSCH 2,350,671
BRAKE BEAM AND GUIDE THEREFOR
Filed Aug. 1, 1941 3 Sheets-Sheet 1
INVENTOR
CHARLES R. BUSCH.
BY Geo. L. Wheelock
ATTORNEY

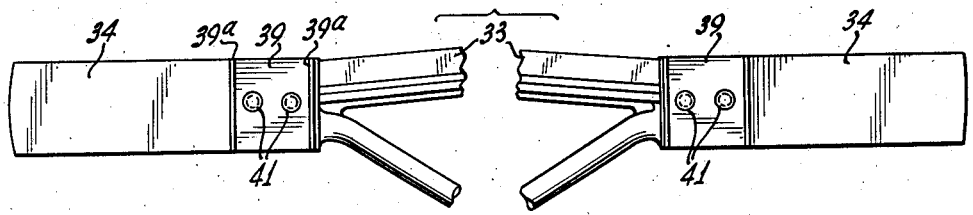
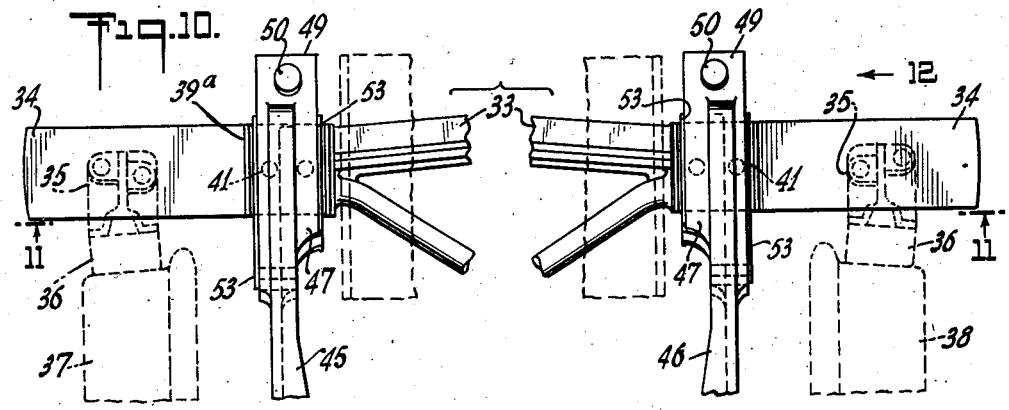
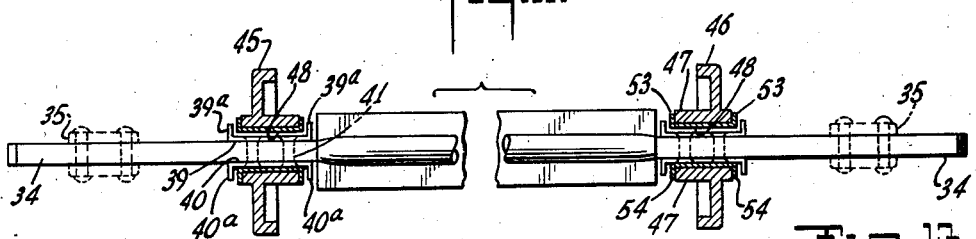
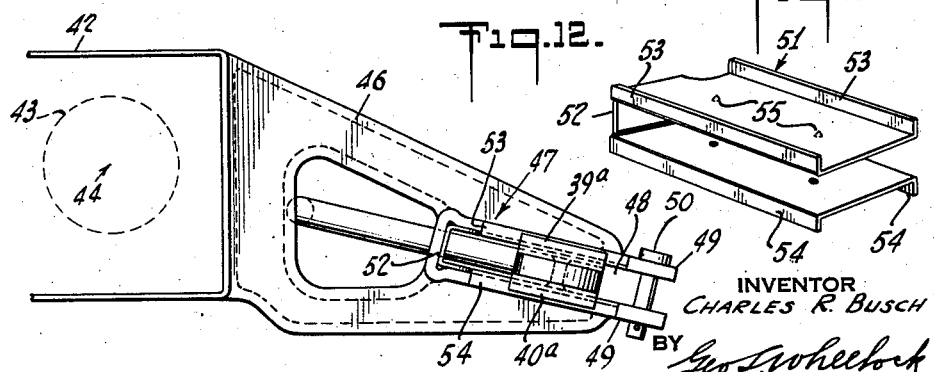

2,350,671

UNITED STATES PATENT OFFICE 2,350,671

BRAKE BEAM AND GUIDE THEREFOR

Charles R. Busch, Orange, N. J., assignor to Buffalo Brake Beam Company, New York, N. Y., a corporation of New York Application August 1, 1941, Serial No. 405,045

11 Claims. (Cl. 188—222)

The present invention relates to brake beams which are adapted to be guided on guide-ways on car truck side frames during brake operation, or more particularly, on guides which are supported in a static position from the axle journal boxes of a car truck, for which latter adaptation reference may be had to one or more of my copending applications, such as Ser. Nos. 393,581, 393,582, 393,583, 393,584, filed May 15, 1941. Said application, Serial No. 393,583 has become Patent No. 2,310,195, dated February 2, 1943. In those applications the static support for the guides is arranged either outboard or inboard of the car wheels.

One of the objects of the present invention is to provide a trussed brake beam having preferably flat end-portions beyond the truss, each of sufficient length to extend beyond either the outboard or inboard side of a car wheel adjacent that end, and adapted to support and guide the beam at either side of such wheel when the beam is operated to apply or release the brake.

Another object of the invention is to provide each guided end-portion of a brake beam with an end-play stop, which projects therefrom in such manner as to restrict the relatively very slight amount of longitudinal movement which the beam may have when it is guided in slotted guides.

Another and important object of the invention is to provide a brake beam which is interchangeable for operation on guides located either inboard or outboard of the wheels of a truck, and to provide wear-coverings or plates on the guided ends thereof which are adapted to resist wear on said ends, whether the beam is guided inboard or outboard.

These being among the objects of the present invention, the same consists of certain features of construction and combinations of parts to be hereinafter described and then claimed with reference to the accompanying drawings which illustrate several embodiments of the invention and wherein—

Fig. 1 is a plan view of a truss brake beam having its strut applied;

Fig. 2 is a front elevation of the beam shown in Fig. 1;

Fig. 3 is a cross section of a metallic cruciform blank, from which the beam is adapted to be made;

Fig. 4 is a cross section of such a blank on line 4—4, Fig. 1, after the blank has been slit and spread;

Fig. 5 is a plan showing one end of the brake beam and a guide for the beam, together with a fragment of the adjacent car wheel in broken lines;

Fig. 6 is a cross section on the line 6—6, Fig. 5;

Fig. 7 is a section on the line 7—7, Fig. 5;

Fig. 8 is a perspective view of a guide wear-lining;

Fig. 9 is a broken plan of a brake beam, showing wear coverings thereon;

Fig. 10 is a plan showing the brake beam of Fig. 9 guided in guides located inboard of the wheels indicated in broken lines;

Fig. 11 is a section on the line 11—11, Fig. 10;

Fig. 12 is a detail view illustrating a journal box, and a beam supported and guided from the box;

Fig. 13 is a perspective view of a modified wear-lining;

Fig. 14 is a perspective view of a wear-plate for each end of a brake beam;

Fig. 15 is a perspective view of another form of wear-covering for the end of a beam;

Fig. 16 is a plan showing the covering of Fig. 15 applied to one end of a guided beam;

Fig. 17 is a section on the line 17—17, Fig. 16;

Fig. 18 is a perspective view of another form of wear-covering applied to one end of a beam which is shown in broken lines; and Fig. 19 is a cross section of a beam end showing a still further modification of the wear-covering.

Referring to Fig. 3, a bar or blank 10 of suitable steel or other metal is used, from which the body of the beam, to be described, is preferably made, and reference may be had to Patent 2,170,- 113 as disclosing how a trussed brake beam can be made from such a blank, although the present invention may be carried out differently. Briefly, the blank 10 is of approximate cruciform or plus-sign shape so as to have a pair of oppositely-directed flanges 11, 12, the longitudinal flange 13 and a rod-shaped rib or bead 14. A longitudinal slit 15 is cut along the blank according to said patent, and the rib or bead 14 spread apart from the flanges 11, 12, 13, as shown in Fig. 4.

As disclosed by said patent, the beam is formed from a single blank to provide a compression-member 16 and a tension-member 17 united integrally with end-portions such as 18, as shown in Fig. 1. There is a difference in this connection, that is to say, under the present invention each end-portion 18 is preferably of greater available length than the end-portions disclosed by said patent. In the present case, and somewhat similar to said disclosure, each end-portion 18 is forged or compacted into a solid mass of metal before the blank is slit. Each end-portion 18 is of substantially oblong shape in plan, and substantially oblong in cross section so as to provide preferably flat surfaces at the top and bottom of the end-portion. Also, as in aforesaid patent, the terminal surface of each end-portion may be of arcuate shape, as shown.

It will be readily perceived that each end-portion 18 of the illustrated beam has relatively greater length than that disclosed in said patent, and this is for the purpose of enabling the brake beam to be guided upon guides at either the outermost or the innermost end of the end-portion.

After the parts 16, 17 and 18 of the beam have been made in the form shown in Figs. 1 and 2, the strut 19 is applied to the compression- and tension-members 17 and forcibly engaged therewith so as to camber the compression-member 16, thereby completing the truss. The truss is short as compared with the previous truss, yet efficient.

As shown in Fig. 5, there is applied to one of the end-portions 18 a brake-head 20, which may be riveted or otherwise suitably fastened to the beam, it being illustrated sufficiently inward of the outer terminal of that end-portion so as to adapt the beam to be there guided in order to apply the shoe 21 to the adjacent car wheel 22 in braking.

The side frame 23 indicated in broken lines in Fig. 5 is illustrated outboard of wheel 22, and between said wheel and side frame a supporting-member 24 shown in Fig. 6 also is located. This member 24 may be, and preferably is, as disclosed in the aforesaid applications, in which it is supported statically directly from the journal-box for the axle which carries wheel 22.

The member 24 is provided with a brake-beam guide 25, as disclosed in said applications, and this guide may be formed by providing it with a slot 26 between the opposed surfaces of the guide. The said opposed surfaces are extended beyond the member 24 by means of lips or ears 27, which are spaced apart sufficiently to permit the insertion and removal of the end-portion of a beam guided in guide 25.

Figs. 5, 6 and 7 illustrate one adaptation of the described beam, the end of which is guided outboard of the adjacent car wheel. To protect the opposed surfaces of the guide 25 against wear it is preferably lined with a wear-lining 29 of substantially U shape in cross section and having a back wall 30 uniting the arms or legs of the U, as shown in Fig. 8. The lining 29 is preferably provided with out-turned flanges 31, which are located at that side of guide 25 which is toward the brake beam, and said lining is preferably of spring steel so that it may be snapped or sprung into position in the guide-slot 26 and held therein by small humps or teats 32, which engage corresponding depressions in the opposed surfaces of the guide.

The slot 26 is open at both or opposite sides of the support 24, and when the lining 29 is in place its back wall 30 provides a wall closing the outer side of the slot 26. It will be appreciated that as the parts to each side of the slot are in the shape of a fork, one side of the slot should be closed as by the wall 30 of the lining, inasmuch as the end 18 of the beam does not extend out beyond the slot. Other forms of linings may be employed, as described herein later.

Referring to Figs. 9–12, inclusive, there is illustrated an adaptation of the beam of Fig. 1, to be guided inboard of the wheels. The trussed beam 33 is provided at opposite ends with flat beam end-portions 34, which extend along the guidable end-portions of the beam, as before described. Brake-heads 35 are mounted on the end-portions 34 to support shoes 36 which are adapted to contact with the treads of the wheels 37, 38.

Wear-plates or coverings 39, 40 of suitable hard metal to resist wear are secured respectively to the upper and lower surfaces of each end-portion 34 directly adjacent to the ends of the relatively short truss. Such a wear-plate is shown in detail in Fig. 14. These plates may be secured to the beam by rivets 41 having their heads countersunk in the wear-plates, or by other suitable means. As more clearly shown in Fig. 11, the wear-plates 39, 40 are provided with oppositely-directed flanges 39a, 40a, which project away from the beam. These flanges constitute stops so as to reduce to a minimum the allowable longitudinal end-play of the beam when it is located in guides. It is preferred to provide wear-resisting covering metal to the guided beam in all cases, although some of the figures of the drawings do not show the same.

In Fig. 12 there is partially shown a journal-box 42, and there is indicated at 43 an axle, and there is also indicated at 44 the axis of a wheel or axle. Journal-boxes such as 42 at opposite sides of a car truck are formed integrally with brake-beam supporting-members or brackets 45, 46, one of which is shown in Fig. 12, and both partially shown in Figures 10 and 11. In this respect the construction shown is the same as in my aforesaid application, Ser. No. 393,582.

Each supporting-member 45, 46 is provided with a brake-beam guide 47 having an inclined slot 48 for receiving the end-portion of the beam. The inclination of each guide is preferably at an angle of 12–14° to the horizontal, and the plane of movement of the beam is preferably in line with the wheel axis 44, as shown in Fig. 12. As each guide 47 is preferably fork-shaped, and has lips 49 extended beyond the body of each bracket 45, 46, said lips are provided with registering holes adapted to receive a removable pin 50, which is for the purpose of retaining the beam in operative position and to permit its removal when desired.

To resist wear of the opposed surfaces of the guide, there is provided a wear-resisting lining 51, as shown in Fig. 13, which is different from the lining shown in Fig. 8, because in this particular adaptation of the invention the end-portions of the beam are guided inboard of the wheels, and such end-portions must extend sufficiently beyond the guides to support the brake-heads and shoes in operative position.

Wear-resisting lining 51 consists preferably of a strip of spring steel, which is bent transversely along two lines into substantially U shape to provide a connecting wall 52 for the opposite legs or arms of the lining, which latter are provided with out-turned flanges 53, 54. There are two flanges 53 parallel with each other, and similarly two flanges 54, which project in opposite directions from the lining. Said lining is provided with small teats or projections 55. When such lining is inserted lengthwise into the slot of the guide 47 in proper position, its connecting wall 52 will be pushed up close to the closed end of the guide-slot and the projections 55 will be sprung into small cavities in the opposing walls of the guide, all as shown in Figs. 11, 12. Sufficient slight clearance should be left between the upper and lower surfaces of the ends of the beam and the lining 51, and sufficient slight clearance between the flanges of the lining and the flanges 39a, 40a of the wear-covering on the beam. The stops or flanges 39a, 40a reduce to a minimum the required amount of end-play of the beam by contacting with the flanges of the wear-lining 51 as the beam tends to move in one or the other longitudinal direction, the last-named flanges protecting the surfaces covered thereby against damage by the before-mentioned stops.

Referring to Fig. 15, there is illustrated a modified wear-covering 56 for each end-portion of the brake beam. This may be made of a strip of spring steel bent transversely along two lines at its middle to provide a connecting-wall 57 for the two arms or legs of said covering. Preferably, the wall 57 is somewhat arcuate for the reason that a brake beam provided with such a covering may be mounted and guided as shown in Fig. 5.

However, the said wear-covering 56 is shown in use in Figs. 16 and 17. It is provided with oppositely-directed stop-flanges 58, 59, and with inwardly-presented teats or projections 60, which may be sprung into corresponding depressions in the flat surfaces of the end-portions of the beam. In said figures the end-portion of the beam extends entirely through the guide 61, which is preferably supported statically from a journal-box, and the covering 56 is placed over the end-portion of the beam so that its end wall 57 abuts the terminal surface of the beam. A suitable wear-lining 62 is rigidly mounted in the guide 61.

To secure the wear-covering 56 on the end of the beam, it is preferred to pass rivets 63 through the covering and the end of the beam at points close to the stop-flanges 58, 59, and to apply the back jaw 64 of the brake-head over the covered end of the beam, and then pass rivets 65 through the back jaw 64, the covering 56 and the end of the beam, thereby securing the brake-head in a rigid position and more efficiently securing the wear-covering to the beam.

Referring to Fig. 18, there is illustrated another modification of a wear-covering for the beam, in which case the wear-covering 66 consists of a piece of spring steel or other hard metal, which is bent similarly to the wear-lining shown in Fig. 13 so as to provide a wall 67 connecting the arms of the covering, which are in turn provided with oppositely-directed flanges 68, 68a. This covering may also be provided with teats 69, which may be sprung into corresponding cavities in the end of the beam, and said covering may furthermore be riveted to the beam. The flat end-portion of the beam is shown in broken lines in Fig. 18, and it will be seen that when the wear-covering 66 is applied thereto the wall 67 will be up against one edge of said end-portion, and that the stop-flanges 68, 68a will extend transversely of said end-portion.

In Fig. 19 the beam 70 is provided with a wear-covering 71, which is a slight modification of what is shown in Fig. 18 in that the wings or arms of the covering are of greater length than the width of the beam 70 so as to provide lateral extensions 72, which are substantially in the plane of the beam. Of course, the covering 71 is rigidly secured to the beam in any desired manner, and it is obvious that the width of bearing surfaces of the beam is greater than the width of the beam 70, thereby tending to reduce to a minimum any rocking movement of the beam during operation, if indeed such rocking would occur.

As specifically described, the brake-beam of the present invention is interchangeable to adapt the beam for guidance either outboard or inboard of the wheels, and some features of the invention adapt the beam for guidance directly upon the truck side frames rather than from guides which are statically supported by the journal-boxes.

It will be obvious to those skilled in the art that the invention is subject to modifications other than those described and shown, and that the invention is not restricted except by the scope of the appended claims.

What I claim as new is:

1. A trussed brake beam, whereof the compression-member and the tension-member are terminated beyond their united ends by guiding end-portions which extend along the major longitudinal axis of the beam, each end-portion having a length sufficient to extend beyond the outboard and inboard sides of a car truck wheel and adapted to support and guide the beam at either side of the wheel when the beam is operated.

2. A trussed brake beam, whereof the compresseion-member and the tension-member are terminated beyond their united ends by guiding end-portions which extend along the major longitudinal axis of the beam, each end-portion having flat upper and lower surfaces defining it, and having a length sufficient to extend beyond the outboard and inboard sides of a car truck wheel and adapted to support and guide the beam at either side of the wheel when the beam is operated.

3. A trussed brake beam, whereof the compression-member and the tension-member are terminated beyond their united ends by guiding end-portions with which they are made integral and which extend along the major longitudinal axis of the beam, each end-portion having flat upper and lower surfaces defining it, and having a length sufficient to extend beyond the outboard and inboard sides of a car truck wheel and adapted to support and guide the beam at either side of the wheel when the beam is operated; the the lengths of the said members being only such as to terminate inboard of two opposite car wheels.

4. A brake beam, including an intermediate truss and flat end-portions, and brake heads mounted on the end-portions inwardly of relatively short projecting lengths of the end-portions, providing for the guidance of the beam by the projecting lengths, and the lengths of the end-portions between the heads and the truss also providing for guidance of the beam, whereby the beam is rendered interchangeable for guidance at different distances from the truss.

5. A brake beam having end-portions extending substantially in line with the intermediate body of the beam and adapted to support and guide the beam when operated in car truck guides, brake heads mounted on the said end-portions, the end-portions having end-play stops thereon projecting outwardly from the plane in which the beam operates, the heads spaced at a distance along the thus in line end-portions nearer to the outer terminals of such portions than the end-play stops, and lengths of the end-portions laterally of each side of each head providing separate guiding surfaces for the beam at opposite sides of the head, and said stops maintaining the heads in braking position when the beam is guided at either side of each head.

6. A brake beam having end-portions adapted to support and guide the beam when operated in car truck guides, and wear-protecting shoes upon and rigid with the end-portions, each shoe consisting of spring sheet metal bent to open U shape and engaged, when moved in a direction transverse of an end portion, laterally with the edge and upper and lower surfaces of each end-portion by its spring action, and each such shoe provided with an end-play stop projecting out from the beam.

7. A brake beam having end-portions adapted to support and guide the beam when operated in car truck guides, and wear-protecting means rigid on the end-portions, each of said end-portions having a length extending outwardly beyond and inwardly of the point on which a brake head is to be positioned and which is sufficient to adapt the beam to be guided either along the outward or inward length of the end-portion, and said wear-protecting means located on one of the extended lengths of the end-portions and having extensions projecting laterally beyond one edge thereof.

8. A trussed brake beam, having beam-guiding end-portions, the truss having a length less than the distance between the inboard sides of opposite wheels of a railway car truck, and the end-portions having lengths which extend from the ends of the truss, inboard of the wheels, to points opposite the threads of such wheels to receive brake-heads, and the end-portions extending their full lengths in alignment with the longitudinal axis of the truss, and guidable means on the inboard ends of the said end-portions adapted to support the beam for guidance on guides of the truck inboard of the wheels.

9. A trussed brake beam, whereof the compression member and the tension-member are terminated beyond their united ends by guiding end-portions which extend along the major longitudinal axis of the beam, each end-portion having a length sufficient to extend beyond the outboard and inboard sides of a car truck wheel and adapted to support and guide the beam at either side of the wheel when the beam is operated, and a shoe-receiving brake-head attached to each end-portion at a point between those lengths thereof which extend for guidance as specified.

10. A truss brake beam, having beam-guiding end-portions, the truss having a length less than the distance between the inboard sides of opposite wheels of a railway car truck, and the end-portions having lengths which extend from the ends of the truss, inboard of the wheels, to points opposite the treads of such wheels to receive brake-heads, such lengths substantially aligned with the longitudinal axis of the truss, and guidable means on the inboard ends of the end-portions adapted to support the beam for guidance on guides of the truck inboard of the wheels, in combination with journal boxes rigidly supporting slotted guides at opposite sides of a car truck, and in which the said inboard guidable means work, whereby such beam may operate in a definite plane with respect to the axis of the adjacent axle.

11. A wear protecting-shoe of U-shaped spring metal, for the ends of a brake beam supportable on guides of a car truck, the shoe arms adapted to clasp an end, and the shoe having a stop projecting away from the plane in which such beam is guidable.

CHARLES R. BUSCH.